United States Patent [19]

Gibney et al.

[11] 3,870,703

[45] Mar. 11, 1975

[54] PRODUCTION OF CELLULOSE ESTERS

[75] Inventors: Kelly B. Gibney, Burnaby; John Howard; Russell S. Evans, both of Vancouver, British Columbia, all of Canada

[73] Assignee: Canadian Cellulose Company, Limited, Vancouver, British Columbia, Canada

[22] Filed: June 21, 1973

[21] Appl. No.: 372,147

[52] U.S. Cl. ................. 260/229, 260/227, 260/232
[51] Int. Cl. .......................... C08b 3/06, C08b 3/10
[58] Field of Search ........................... 260/227, 229

[56] References Cited
UNITED STATES PATENTS

| | | | |
|---|---|---|---|
| 1,668,944 | 5/1928 | Clarke et al. | 260/229 |
| 1,697,907 | 1/1929 | Dreyfus et al. | 260/229 |
| 2,028,080 | 1/1936 | Stern | 260/229 |
| 2,600,716 | 6/1952 | White et al. | 260/227 |
| 2,603,634 | 7/1952 | Seymour et al. | 260/229 |
| 3,037,902 | 6/1962 | Fahey et al. | 260/227 |

*Primary Examiner*—Ronald W. Griffin
*Attorney, Agent, or Firm*—Thomas J. Morgan; Robert J. Blanke

[57] ABSTRACT

In the production of a solution of cellulose acetate by esterifying cellulose with acetic anhydride in acetic acid, the improvement which comprises using as the cellulose source wood pulp which has been only partially purified but still contains at least about 5% by weight of hemicellulose. The hemicelluloses are first preferentially etherified or esterified with an agent different from that ultimately employed for esterification. The presence of different groups on the hemicellulose prevents formation of complexes with the cellulose ester during the subsequent conventional esterification, the complexes apparently being the source of filter blockage during ultimate formation of fibers of extrusion.

6 Claims, No Drawings

PRODUCTION OF CELLULOSE ESTERS

The present invention relates to the production of high quality solutions of cellulose esters from low quality sources.

Cellulose esters of organic acids are useful for a variety of purposes. Principally cellulose acetate is used for production of fibers although it is also used in large amounts for production of plastic sheets, films, moldings, adhesives and the like. Cellulose propionate is especially suited for moldings as are cellulose acetate-butyrate.

A standard way of making the foregoing end products is to esterify cellulose with a solution of the anhydride of the acid whose ester is to be produced dissolved in the corresponding acid so that the resulting ester will form a solution in the acid. The resulting solution can be used as such to produce fibers or films by extrusion into air or water, but the standard procedure is to spray the solution into a solvent for the acid which is a non-solvent for the dissolved ester, whereby the ester precipitates in a flaky form. Thus, water is the precipitant normally employed. The cellulose ester flake is then washed, dried and stored. It may subsequently be melted and thus used for fiber and film production or, far more often, it is dissolved in a volatile solvent such as acetone or methylene chloride-methanol and extruded into an evaporative atmosphere wherein the solvent is evaporated.

In carrying out the ultimate extrusion in production of fibers, for example, the solution is extruded through a spinnerette or jet provided with many minute orifices less than 1 mm and usually less than 0.050 mm in diameter. If these holes become clogged in whole or even in part the quality of the product will suffer markedly. It is accordingly customary to place upstream of the spinnerette one or more filters to remove any materials which might otherwise clog the spinnerette. These filters are usually replaced when the pressure drop across them reaches some pre-determined level before the filters fail or extrusion is unintentionally interrupted. The replacement of the filter necessitates interruption of the extrusion operation with obvious loss of productive capacity and additional time is lost in bringing the system to steady state after start up.

Examination of the material clogging a filter has revealed it is essentially non-cellulosic and, accordingly, it has been the practice to use cellulose sources which are as free as possible of non-cellulosic impurities. To this end the best source of cellulose is cotton linters but this is relatively expensive and of limited availability.

One of the most widely available cellulose sources is wood pulp, i.e., the residue after de-lignification of wood. Standard paper grade pulps produced by the kraft, sulfite or other pulping techniques have too high a content of non-cellulosic material and thus special pulping and purification techniques, e.g., chlorination and alkaline refining, are required to produce an acetylation grade pulp. The additional purification steps add to the cost of the cellulose and reduce the amount of material as a result of purification losses so that the products are increased in cost; obviously the by-products produced are a potential source of pollution and thus present a disposal problem. The quality demands on acetylation grade wood pulps are even higher than on nitration grade pulps.

It is accordingly an object of the present invention to produce fiber grade cellulose esters from low cost cellulose sources by a simple inexpensive technique.

It is a further object of the invention to produce fiber grade cellulose esters in high yield from such low cost cellulose sources.

These and other objects and advantages are realized in accordance with the present invention which relates to an improvement in the standard process for the production of a solution of a cellulose lower alkanoate wherein cellulose is subjected to esterification with a lower alkanoic acid anhydride in a lower alkanoic acid thereby to form said cellulose lower alkanoate dissolved in said acid. The departure herein resides in reacting said pulp, prior to esterification with said lower alkanoic acid anhydride, with an etherifying agent or an esterifying agent different from the lower alkanoate ester ultimately desired, said agent being employed in more than the stoichiometric amount required for reaction with the hemicellulose, whereby the solution of cellulose lower alkanoate ultimately produced is characterized by a performance during subsequent processing comparable to that of initially more pure cellulose sources.

Pre-esterification with an esterifying agent identical to the lower alkanoate ester ultimately desired also effects some improvements in subsequent processing performance comparable to use of initially more pure cellulose sources.

Our investigations have revealed that the principal impurities of a bleached but non-alkaline refined raw sulfite pulp, for example, are hemicelluloses such as xylan and mannan. The ultimate filterability of cellulose ester solutions was dependent upon the initial hemicellulose content; thus the quality of fiber produced by extrusion and the length of time between filter changes were also dependent upon the hemicellulose content or the cellulose source. We further found that the hemicelluloses esterified more rapidly than the cellulose so that hemicellulose acetates dissolved first and interacted with the cellulose during its acetylation, forming a complex material which was insoluble or of limited solubility in the esterification medium, and it was this complex which formed the bulk of the material ultimately clogging the filter.

It is believed that the formation of the complex is the result of the similarity in shape of the hemicellulose and cellulose molecules as well as of the size and shape of the ester groups added thereto. The process of the present invention avoids formation of the insoluble complexes by making the components thereof sufficiently different so as not to interact. Specifically, the hemicellulose is initially and preferentially caused to react with and receive a substituent, either as an ether or an ester different from the ester groups intended for the cellulose. Thereafter, esterification is conducted in conventional manner and the ultimate cellulose ester solution containing dissolved hemicellulose derivative performs comparably to cellulose ester solutions obtained from initially much more pure cellulose sources.

In practicing the invention the cellulose source may be a partially purified wood pulp made by any standard procedure, especially the sulfite process. Advantageously, it has undergone a bleaching treatment to improve its color but not an alkaline refining such as is normally required to reduce the hemicellulose content. The hemicellulose content which, in conventional acetylation grade pulps, must be less than about 5% and usually less than about 3%, may thus be much higher than about 5%, even as high as about 8%, 10% or even more.

The agent which preferentially etherifies or esterifies the hemicellulose may vary widely. It can be any of the esterifying acid anhydrides normally intended for cellulose ester production, e.g., the lower alkanoic acid anhydrides, provided it is different from the alkanoate of cellulose which is ultimately to be produced. Thus, for example, if the product ultimately desired is cellulose acetate the initial esterifying agent may be formic, propionic and/or butyric acid anhydrides.

In place of organic acid esters of the hemicellulose inorganic acid esters may be formed as by reaction with at least one inorganic oxygen-containing acid of nitrogen, sulfur or phosphorus or an alkali metal salt thereof. Representative acids include nitric acid, nitrous acid, phosphoric acid, and the like and representative salts include sodium nitrate, potassium nitrite, potassium dihydrogen phosphate, and the like.

Another group of agents, suited for producing hemicellulose ethers, includes the reactive derivatives of at least one of methanol, ethanol, cyanoethanol, ethylene glycol and propylene glycol. The reactive derivative may be an epoxide, e.g., ethylene or propylene oxide, or it may be a halide in which event alkali is required in conventional manner to split out hydrogen halide and form the ether.

The amount of etherifying or esterifying agent employed relative to the pulp may vary widely, depending upon the amount of hemicellulose in the pulp. It is generally at least sufficient in equivalents of agent employed to correspond to at least about 50% of the hemicellulose hydrolysis but is desirably employed in much greater amount, e.g., in at least about 1 or preferably about 1.5 to 2.5 times the stoichiometric amount equivalent to react with all the hydroxy groups of the hemicellulose.

The etherification reaction prior to conventional esterification may be conveniently effected in the pulp during the pulp manufacture as part of a bleaching and alkaline refining sequence. Introduction of the active base which may be sodium hydroxide or other alkali or alkaline earth hydroxide at about 1 to 12% by weight, is carried out before or after achieving a desirable consistency of about 5 or 10% to 50 or even 60%. When pulp is used in certain acetylation processes, even caustic of mercerizing strength might be employed. Addition of etherification reagents of the Williamson-synthesis type, e.g., alkyl halides, will generally require more alkali than those of the Michael-addition type, e.g., ethylene oxide or acrylonitrile due to the elimination of acids during etherification. Addition of the etherifying reagents may be carried out as gaseous reagents, neat liquids or solutions to the pulp at desired consistency. A higher consistency can be employed, even up to a dried pulp sheet if an organic amine such as trimethylamine or triethylamine is used to catalyze the etherification reactions of the Michael-type additions of reagents such as ethylene oxide, propylene oxide and acrylonitrile. Reaction temperature can be as low as even 10°C or as high as 120°C. The pressure in the reaction vessel may be above or below atmospheric pressure dependent on desirable temperatures, reaction rates, as well as safety in carrying out the etherification with hazardous reagents. The etherification reaction duration will depend on the hemicellulose content and its desired extent of reaction and may range from about 10 minutes to 2 or 3 or even more hours. Dried pulp may then be acetylated, after activation, with acetic anhydride, acid and catalyst in a standard esterification.

In the case of pre-esterification, initial reaction may be effected in the same solvent ultimately employed for esterification and dissolution, e.g., acetic acid when producing cellulose acetate. In such event, after the initial reaction the composition is adjusted to standard values and esterification is carried out. If a different solvent is employed initially it may be drained away, and the product optionally washed to remove any adherent by-products such as salts, after which anhydride and acid are provided for the standard esterification.

The composition of the esterification mix is more or less conventional and may range from about 0.05 to 10 parts by weight of anhydride per part by weight of acid, one additional mole of acid being formed for each mole of anhydride which reacts.

A catalyst such as sulfuric acid, phosphoric acid, trichloracetic acid or the like is preferably employed during esterification in standard amount, e.g., about 0.14 part per part by weight of wood pulp. Prior to esterification, the raw wood pulp preferably has undergone a pretreatment with acid, possibly even in the presence of catalyst but without the anhydride or otherwise under conditions which will not result in esterification.

The duration of the initial esterification will depend upon the hemicellulose content and its desired extent of initial reaction, the nature and proportion of reactant, the temperature, and the like. About 5 to 30 minutes under standard esterification conditions has been found adequate to bring the content of unreacted hemicellulose in the wood pulp from an initial value of more than 8% to less than 3%.

After this pre-reaction and the subsequent conventional esterification, the resulting cellulose ester solution having the hemicellulose derivative dissolved therein may then be treated in conventional manner as by neutralizing the sulfuric acid catalyst, adding water to convert any residual anhydride to acid, ripening to hydrolyze any sulfuric acid ester bonds and/or to reduce the esterification degree from the theoretical maximum of 3 ester groups per anhydroglucose unit to some lower value which will determine the solubility, thermal properties and crystallographic properties of the ester. The solutions may then be extruded as such to form fibers, i.e., direct spinning, but they are preferably sprayed into a body of water in conventional manner to form a lacy flake which is dried and stored prior to subsequent dissolution in a more suitable solvent for extrusion, e.g., acetone for hydrolyzed cellulose esters and alkyl halide/alkanol such as methylene chloride/methanol for cellulose esters having almost 3 ester groups per anhydroglucose unit.

The invention will be further illustrated in the following examples wherein all parts are by weight unless otherwise expressed.

EXAMPLE 1

3 Parts of paper grade sulfite pulp of high mannan content (9.2%), is activated by pretreatment with 750 parts of water, followed by five rinses with 150 parts of acetic acid. Samples of such activated pulp are preesterified at 35°C in separate experiments with acetic (1.28 parts), propionic (1.64 parts) and butyric anhydride (1.99 parts), respectively, in amounts equal to twice the stoichiometric requirement of the glucomannan present and with 96.1 parts acetic acid and 0.395 parts sulfuric acid catalyst. After 10 minutes pre-esterification the conventional amount of acetic anhydride for conversion of cellulose to cellulose acetate (10.9 parts) is added and the acetylation carried to completion as ascertained by solution viscosity reaching a target level.

Results are assessed by weighing the residues recovered from the final ester solutions by ultracentrifugation. Residues are seen to decrease progressively as the molecular weight of the first stage ester group increases in homologous series, acetate, propionate, butyrate, i.e., when the pre-action agent is different from the principal esterifying agent less material of limited solubility is present in the mixture so there is less material to clog a filter. The results are shown in Table 1.

TABLE 1

| Pre-esterification Agent | Residue Weight, mg. |
|---|---|
| Acetic anhydride | 800 |
| Propionic anhydride | 770 |
| Butyric anhydride | 650 |

EXAMPLE 2

A nitration-grade sulfite pulp with (100 parts) 2.85% mannan content and 6 parts water as moisture content is activated with 37 parts acetic acid at 25°C for at least 2 hours. Separate samples of this activated pulp are pre-esterified at 20°C with acetic (57.8 parts), propionic (73.6 parts) and butyric (89.6 parts) anhydride, respectively, in the presence of acetic acid (54.4 parts) and sulfuric acid catalyst (14 parts). After 10 minutes pre-esterification the balance of the acetic acid (282 parts) and the conventional amount of acetic anhydride (251 parts) pre-chilled to −5°C are added and the acetylation carried to completion.

Results are assessed at the triacetate dope stage by measuring acid dope filterability in milliliters of solution passing through a 5 micron filter until blocking occurs at a fixed pressure and by weighing the residues recovered from the acid dope solution by ultra-centrifugation. Filterabilities are seen to increase and residues are seen to decrease as the molecular weight of the first stage ester group increases in the homologous series, acetage, propionate, butyrate, i.e., when the pre-action agent is different from the principal esterifying agent less material of limited solubility is present in the acid dope solution so there is less material to clog a filter. The results are shown in Table 2.

TABLE 2

| Pre-esterification Agent | Filterability, mls | Residue Weight, mg |
|---|---|---|
| Acetic anhydride | 73.8 | 108.1 |
| Propionic anhydride | 110.7 | 106.7 |
| Butyric anhydride | 69.2 | 102.3 |
| Conventional acetylation control | 9.6 | 245.5 |

In addition, even pre-esterification with the same esterifying agent can be seen to be an advantageous method to obtain improved quality compared to the control.

The cellulose acetate solutions are suitable for use in making cellulose acetate fibers by neutralizing the catalyst, hydrolyzing to an acetyl value of about 55% calculated as acetic acid, jet spraying into water to form cellulose acetate flake, drying and then re-dissolving in 95% acetone to a content of about 27% by weight. The requisite frequency of filter changing is no greater with cellulose acetate made from high hemicellulose content wood pulp processed as indicated than from cellulose acetate made in conventional manner from wood pulp of lower hemicellulose content.

EXAMPLE 3

A paper sulfite pulp (3 parts or 17.4 millimoles) of high mannan content (9.2% with 6% moisture is activated as in Example 1, then mixed with 96.1 parts acetic acid and 10.9 parts acetic anhydride but with no sulfuric acid catalyst. In separate experiments sodium nitrate, potassium nitrite and potassium dihydrogen phosphate are added with sulfuric acid sufficent only to promote formation of nitrate, nitrite and phosphate esters. After 10 minutes pre-treatment at 35°C the conventional amount of sulfuric acid (0.395 parts) is added and acetylation of the pulp is effected in conventional manner as outlined in Example 1.

Results are assessed by weighing the residues recovered from the final cellulose acetate-inorganic ester solutions with an ultracentrifuge. Residue weights are compared in Table 3 below with residue from the same pulp similarly treated but without inorganic salts. Infrared examination of precipitated and washed cellulose acetate from the nitrate and nitrite experiments showed strong N-O stretching peaks, indicating the presence of inorganic esters.

TABLE 3

| Treatment (millimoles) | Residue Weight, mg. |
|---|---|
| Control, no salts | 780 |
| NaNO$_3$(4mM) H$_2$SO$_4$(2mM) | 100 |
| KNO$_2$(4mM) H$_2$SO$_4$(2mM) | 100 |
| KH$_2$PO$_4$(4mM) H$_2$SO$_4$(2mM) | 240 |

These products are also suited for production of cellulose acetate fibers with long time intervals between filter changes.

EXAMPLE 4

Six grams of raw sulfite pulp, purified only by chlorination, are steeped for 1 hour at 35°C with 200 milliliters of 9% aqueous caustic (by weight) containing 10 milliliters of dimethyl sulfate. After filtration and washing, the partially methylated pulp containing 6% of moisture is acetylated in conventional fashion by aqueous activation and acetylation in the proportion of 3 parts of pulp with 10.9 parts acetic anhydride, 0.395 parts sulfuric acid catalyst and 96.1 parts of acetic acid at 35°C until all fibers dissolve and the solution reaches a target viscosity. The quality is assessed by measuring the quantity of an acid dope solution which passes through a 5 micron filter. The quantity of solution passed before clogging of the filter is compared with that from raw pulp caustic extracted in the same way but in the absence of dimethyl sulfate. The increase in filterability for the pre-etherified wood pulp is shown in Table 4 along with a reduction in the amount of detectable mannan and xylan hemicelluloses due to substitution of mannose and xylose by methyl ether groups and a reduction in haze which is a function of % transmittance at 6,400A.

TABLE 4

| Treatment | Mannan % | Xylan % | Acetate Haze | Acetate Filterability, ml. |
|---|---|---|---|---|
| 200 mls 9% NaOH | 3.32 | 0.66 | 149 | 1.6 |
| As above plus 10 mls $Me_2SO_4$ | 2.33 | 0.53 | 57 | 11.8 |

EXAMPLE 5

106 Parts of air-dry sulfite paper pulp is slurried into a mixture of 815 parts of 2% weight-weight caustic soda containing 23.9 parts of acrylonitrile. The resulting slurry reacts at room temperature (21°C) for a period of 120 minutes after which it is filtered, washed and the caustic neutralized. Following air drying the cyanoethyl paper pulp sample contains 0.895% nitrogen on an oven-dry basis which corresponds to a degree of substitution of 0.1075.

EXAMPLE 6

106 Parts of air-dry sulfite paper pulp is slurried into 835 parts of 6% weight-weight caustic soda solution after which it is filtered to give a pulp pad of 400 parts of 25% weight-weight consistency in 6% weight-weight caustic soda. The pad is pin shredded and placed in an autoclave. The autoclave is evacuated and 12.6 parts methyl chloride is introduced for a final pressure of 60 psi. The autoclave is heated to 100°C for 30 minutes and then cooled. The methylated paper pulp is dispersed in water, neutralized, filtered, washed and air dried for a yield of 93%.

EXAMPLE 7

105.3 Parts of air-dry sulfite paper pulp is evenly sprayed with 6% weight-weight caustic soda until the sheet weight is 287.3 parts. The sheet is placed in an autocalve which is then evacuated before its pressure is raised to 60 psi by introduction of 12.6 parts of methyl chloride. The autoclave is heated to 100°C for 40 minutes. On cooling the methylated paper pulp is washed, neutralized and air dried for a final yield of 96% with 1.89% methoxyl groups.

EXAMPLE 8

97 Parts of air-dry sulfite paper pulp is evenly sprayed with 2% weight-weight caustic soda until the sheet weight is 186.4 parts. The sprayed sheet is placed in a glass reaction kettle which is then evacuated and heated to 61°C. 15.2 Parts of ethylene oxide is then introduced in four stages so as to maintain negative pressure in the reaction vessel at all times. The reaction is continued for 143 minutes before removing the vessel from the temperature control bath. The vacuum is released and the pulp is slurried in water, neutralized, filtered and air dried for a final yield of 102%.

EXAMPLE 9

The etherified sulfite paper pulps from Examples 5, 6, 7 and 8 are acetylated separately by aqueous pretreatment of 3 parts in 750 parts of water followed by filtration and rinsing five times with 150 parts of glacial acetic acid each time. The activated pulp is added to a total of 96.1 parts acetic acid, 10.9 parts acetic anhydride and 0.395 parts sulfuric acid as catalyst. The reaction is carried out in a 35°C bath until a target solution viscosity is obtained. Acid dope solution, filterability as outlined in Example 2 and milligrams of insolubles on ultracentrifugation are used to assess the quality improvements. Data is outlined in Table 5 as compared to a control acetylation of the sulfite paper pulp raw material.

EXAMPLE 10

106 Parts of the etherified sulfite paper pulps from Examples 5, 6, 7 and 8 are activated by treatment with 37 parts of acetic acid at 25°C for at least 2 hours. The activated pulp and acetic acid are added to a slurry of 336 parts acetic acid, 251 parts acetic anhydride and 14 parts sulfuric acid as catalyst which has been pre-cooled to −5°C. The reaction is allowed to proceed for 7 minutes at 21°C at which time the reaction vessel is placed in a 38°C bath for completion of the reaction. The solution quality is assessed by filterability and insolubles content in the same manner as in Example 9. The quality improvements over the control are illustrated in Table 5.

TABLE 5

| Sample Sulfite Paper Pulp | | Reaction Time, min. | Filterability, mls | Residue Weight, mg |
|---|---|---|---|---|
| EXAMPLE 9 | | | | |
| Cyanoethylated | Example 5 | 82 | 5.6 | 133.7 |
| Methylated | Example 6 | 47 | 73.5 | 17.6 |
| Methylated | Example 7 | 56 | 8.5 | 93.9 |
| Hydroxyethylated | Example 8 | 59 | 9.6 | 76.2 |
| Control | | 140 | Below Range | 1150 |
| EXAMPLE 10 | | | | |
| Cyanoethylated | Example 5 | 60 | 2.5 | 846.1 |
| Methylated | Example 6 | 60 | 5.4 | 342.7 |
| Methylated | Example 7 | 60 | 2.2 | 550.1 |
| Hydroxyethylated | Example 8 | 60 | 2.6 | 501.7 |
| Control | | 120 | Below Range | 1150 |

It will be appreciated that the instant specification and examples are set forth by way of illustration and not limitation, and that various modifications and changes may be made without departing from the spirit and scope of the present invention.

What is claimed is:

1. In the production of a solution of a cellulose lower alkanoate suitable for use in the formation of fibers wherein a cellulose source is subjected to the esterification with a lower alkanoic acid anhydride in a lower alkanoic acid thereby forming said cellulose lower alkanoate dissolved in said acid, the improvement which comprises employing as said cellulose source, cellulose having a hemicellulose content in excess of about 5% by weight, and prior to esterification with said lower alkanoate acid anhydride, reacting said cellulose with an anhydride esterifying agent different from the lower alkanoate ester ultimately desired for a period of from 5 to 30 minutes, said agent being employed in more than the stoichiometric amount required for reaction with the hemicellulose, whereby said hemicellulose is preferentially esterified and whereby the solution of cellulose lower alkanoate ultimately produced is characterized by a performance during subsequent processing comparable to that of initially more pure cellulose sources.

2. The process of claim 1 wherein the cellulose source is wood pulp having a hemicellulose content in excess of about 8% by weight.

3. The process of claim 1 wherein said lower alkanoic acid is acetic acid and said anhydride is acetic anhydride.

4. The process of claim 3 wherein said agent is at least one of formic, propionic and butyric anhydrides.

5. The process of claim 3 wherein said agent is employed in about 1.5 to 2.5 times the stoichiometric amount of the hemicellulose and the reaction is carried to the point where at least about 50 percent of the hemicellulose is reacted.

6. The process of claim 4 wherein the cellulose source is wood pulp having a hemicellulose content in excess of about 8% by weight, said agent is employed in about 1.5 to 2.5 times the stoichiometric amount of the hemicellulose and the reaction is carried to a point where at least about 50 percent of the hemicellulose is reacted.

* * * * *